H. OLIVER.
MOLDS FOR SHAPING SHOVEL-HANDLES.

No. 182,467. Patented Sept. 19, 1876.

UNITED STATES PATENT OFFICE.

HIRAM OLIVER, OF INDUSTRY, MAINE.

IMPROVEMENT IN MOLDS FOR SHAPING SHOVEL-HANDLES.

Specification forming part of Letters Patent No. 182,467, dated September 19, 1876; application filed March 11, 1876.

*To all whom it may concern:*

Be it known that I, HIRAM OLIVER, of Industry, in the county of Franklin and State of Maine, have invented certain new and useful Improvements in Molds for Shaping Shovel-Handles; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1:
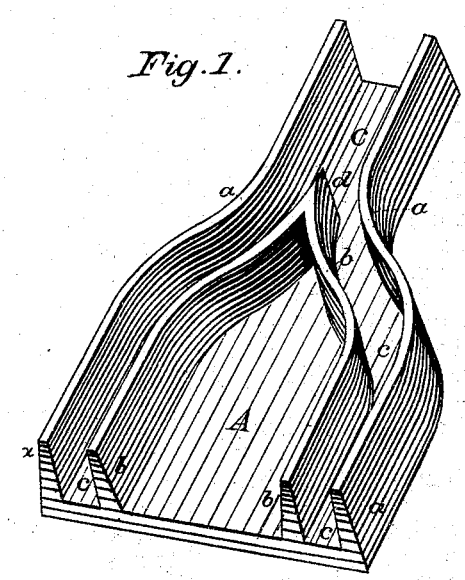
Figure 2:
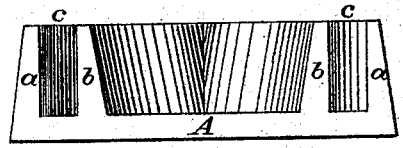

Figure 1 is a perspective view, and Fig. 2 is a rear elevation.

Similar letters of reference indicate corresponding parts.

The object of my invention is to facilitate the shaping of handles of shovels and other similar tools by the use of a mold, the construction of which is hereinfter more fully shown and described.

My improved mold consists of a base or plate, A, the sides of which are curved, as shown in the drawing, so as to give the plate the exact configuration that the shovel-handles are intended to have. Plate A has on each side a raised rim or flange, a, the inside of which is at right angles with the base, while the outside may be sloping, so as to give strength to the mold. The distance between rims a at the narrow end of plate A is just sufficient to admit of the insertion of the wooden rods from which the handles are to be manufactured.

Parallel with rims a a, and at a distance from them equal to one-half the distance between rims a a, at the narrow end of plate A, are two other rims, b b, uniting in a sharp edge, d, at the narrow end of the mold. The side of rims b b facing rims a a is at right angles with base A. Rims a a and b b thus form two curved channels, c c, uniting at the narrow end of the mold in a wide open mouth, C, and open at the opposite wider end of the mold.

The mode of shaping shovel-handles by the use of my improved mold is as follows: The rods from which the handles are to be manufactured, being previously cut and trimmed to the proper length and thickness, are split with a saw to a suitable distance (about seven inches) from the end. The split ends are then steamed or boiled until the wood becomes pliable, when they are ready to be inserted into the molds. Into these they are forced through opening C. Edge d divides them, and they are forced into channels c c, which have the exact curve that the handles are to have. The ends protruding from channels c may then be cut off, and the handles are ready for drying. While being dried they are allowed to remain in the molds, and when perfectly dry they have permanently acquired their proper shape.

Having thus described my invention, I claim and desire to secure by Letters Patent of the United States—

The mold herein described for shaping the handles of shovels and other similar tools, consisting of a base-plate, A, having curved channels c c, formed by the rims a a and b b, the latter converging to a sharp edge or shoulder, d, substantially as and for the purpose herein shown and described.

In testimony that I claim the foregoing as my own I have hereto affixed my signature in presence of two witnesses.

HIRAM OLIVER.

Witnesses:
GEORGE C. OLIVER,
ELIAS OLIVER.